US009763201B2

(12) United States Patent
Miao et al.

(10) Patent No.: US 9,763,201 B2
(45) Date of Patent: Sep. 12, 2017

(54) POWER CONTROL METHOD IN MIXED CELLULAR AND D2D NETWORK AND UE

(71) Applicant: Telefonaktiebolaget L M Ericsson (publ), Stockholm (SE)

(72) Inventors: Qingyu Miao, Beijing (CN); Qianxi Lu, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 142 days.

(21) Appl. No.: 14/413,003

(22) PCT Filed: Dec. 4, 2014

(86) PCT No.: PCT/CN2014/093022
§ 371 (c)(1),
(2) Date: Jan. 5, 2015

(87) PCT Pub. No.: WO2015/113444
PCT Pub. Date: Aug. 6, 2015

(65) Prior Publication Data
US 2016/0278022 A1 Sep. 22, 2016

(30) Foreign Application Priority Data
Jan. 28, 2014 (WO) ................ PCT/CN2014/071670

(51) Int. Cl.
H04B 1/00 (2006.01)
H04B 17/00 (2015.01)
(Continued)

(52) U.S. Cl.
CPC ......... H04W 52/243 (2013.01); H04W 24/10 (2013.01); H04W 52/241 (2013.01); H04W 52/36 (2013.01); H04W 52/383 (2013.01)

(58) Field of Classification Search
CPC .................................................. H04W 52/243
(Continued)

(56) References Cited

U.S. PATENT DOCUMENTS 8,811,374 B2 * 8/2014 Charbit ............. H04W 56/0045
370/350
9,271,244 B2 * 2/2016 Li ......................... H04W 52/46
(Continued)

FOREIGN PATENT DOCUMENTS

CN 102088736 A 6/2011
CN 103079262 A 5/2013
(Continued)

OTHER PUBLICATIONS

International Search Report and Written Opinion for International Application No. PCT/CN2014/093022, mailed Feb. 27, 2015, 13 pages.
(Continued)

Primary Examiner — Tilahun B Gesesse
(74) Attorney, Agent, or Firm — Nicholson De Vos Webster & Elliott LLP

(57) ABSTRACT

The present disclosure discloses a power control method performed by a User Equipment (UE) in a mixed cellular and device-to-device (D2D) network and the UE. The method comprises obtaining one or more power control related parameters for each of one or more neighboring cells of a serving cell for the UE from the serving cell or the neighboring cell. The one or more neighboring cells are asynchronous with the serving cell. The method further comprises adapting a D2D transmission power of the UE based on the obtained power control related parameters so as to reduce interference from the UE to cellular transmission of the one or more neighboring cells.

21 Claims, 6 Drawing Sheets

(51) Int. Cl.
*H04B 7/00* (2006.01)
*H04W 52/24* (2009.01)
*H04W 52/38* (2009.01)
*H04W 24/10* (2009.01)
*H04W 52/36* (2009.01)

(58) Field of Classification Search
USPC .................................. 455/522, 69, 127.1
See application file for complete search history.

(56) References Cited

U.S. PATENT DOCUMENTS

| | | | | |
|---|---|---|---|---|
| 9,445,422 | B2* | 9/2016 | Klang | H04W 72/082 |
| 2009/0325625 | A1* | 12/2009 | Hugl | H04W 52/16 |
| | | | | 455/522 |
| 2011/0312331 | A1* | 12/2011 | Hakola | H04W 72/085 |
| | | | | 455/452.2 |
| 2012/0106517 | A1* | 5/2012 | Charbit | H04W 72/04 |
| | | | | 370/336 |
| 2012/0250531 | A1 | 10/2012 | Patil et al. | |
| 2013/0109430 | A1* | 5/2013 | Tseng | H04W 52/383 |
| | | | | 455/522 |
| 2013/0128858 | A1* | 5/2013 | Zou | H04W 72/0453 |
| | | | | 370/329 |
| 2013/0157650 | A1* | 6/2013 | Yavuz | H04W 24/02 |
| | | | | 455/422.1 |
| 2013/0310103 | A1 | 11/2013 | Madan et al. | |
| 2014/0094213 | A1* | 4/2014 | Khoshnevis | H04W 52/383 |
| | | | | 455/522 |
| 2015/0078270 | A1* | 3/2015 | Seo | H04W 52/46 |
| | | | | 370/329 |
| 2015/0117332 | A1* | 4/2015 | Li | H04W 36/0055 |
| | | | | 370/329 |

FOREIGN PATENT DOCUMENTS

| | | |
|---|---|---|
| CN | 103139889 A | 6/2013 |
| WO | 2013134950 A1 | 9/2013 |

OTHER PUBLICATIONS

Examination Report for counterpart Bangladesh Application No. 289/2014/419, mailed Feb. 1, 2016, 1 page.
International Preliminary Report on Patentability for Application No. PCT/CN2014/093022, mailed Apr. 19, 2016, 7 pages.
Extended European Search Report for Application No. 14880880.1, dated Jul. 7, 2017, 7 pages.

* cited by examiner

POWER CONTROL METHOD IN MIXED CELLULAR AND D2D NETWORK AND UE

CROSS-REFERENCE TO RELATED APPLICATIONS

This application is a National stage of International Application No. PCT/CN2014/093022, filed Dec. 4, 2014, which claims priority to International Application No. PCT/CN2014/071670, filed Jan. 28, 2014, which are hereby incorporated by reference.

TECHNICAL FIELD

The present disclosure generally relates to the technical field of mobile communication systems, and particularly, to a power control method performed by a User Equipment (UE) in a mixed cellular and device-to-device (D2D) network and the UE.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Recent developments of the $3^{rd}$ Generation Partnership Project (3GPP) Long Term Evolution (LTE) facilitate accessing local Internet Protocol (IP)-based services in various places, such as at home, office, or public hot spots, or even in outdoor environments. One of the important use cases for the local IP access and local connectivity involves a so-called D2D communication mode, wherein UEs in close proximity (typically less than a few tens of meters, but sometimes up to a few hundred meters) communicate with each other directly.

As discussed in Reference 1 (G. Fodor, G. Mildh, E. Dahlman and S. Parkvall, "Network Assisted D2D Communications in LTE", FRA Seminar material, December 2010), because D2D UEs are much closer to each other than cellular UEs that have to communicate via at least one cellular access point (e.g., an eNodeB (eNB)), the D2D communication enables a number of potential gains over the traditional cellular technique, including capacity gain, peak rate gain, and latency gain.

The capacity gain may be achieved, for example, by reusing radio resources (e.g., Orthogonal Frequency Division Multiplexing (OFDM) resource blocks) between D2D and cellular communications and by reducing the number of links between UEs from two to one and accordingly reducing the radio resources required for one link. The peak rate gain directly results from the relatively short distance between D2D UEs and the potentially favorable propagation condition therebetween. The latency gain is also a direct result of the single relatively short link between D2D UEs.

FIG. 1 illustrates an example of a mixed cellular and D2D network according to the prior art, wherein UE 101 is a cellular UE which communicates via an eNB 110, whereas UEs 102 and 103 are D2D UEs which communicate with each other directly. UE 101 may be also a D2D UE, which communicates with other D2D UEs such as UE 103. As Reference 1 suggests, in such a mixed cellular and D2D network, D2D communications share radio resources with UL cellular communications, and a Time Division Multiplexing (TDM) is used for dividing resources between cellular communications and D2D communications, so as to avoid collision.

FIG. 2 illustrates an example TDM based cellular/D2D resource division. As shown in FIG. 2, cellular regions and D2D regions are separated in time domain within a cell. It should be noted that the resource division may be known by each D2D UE via system broadcast information. Within the allocated D2D resource pool, each UE may select resource for D2D transmission. However, since it is possible that different cells are asynchronous with each other, the D2D resource pool within cell 1 could collide with the cellular resource pool in cell 2, thereby leading to inter-system interference between the two cells.

However, if there is no inter-cell synchronization (if considering intra-cell synchronization can be easily achieved, between intra-cell sectors), there would be still inter-system (cellular and D2D system) interference among neighboring cells.

FIG. 3 illustrates simulations for cellular capacity versus D2D capacity via the TDM solution in different scenarios, where Case 1: 500 m ISD, uniformly outdoor; Case 2: 1732 m ISO, uniformly outdoor.

From the simulations, it can be seen that the inter-system interference would cause dramatically drop of cellular throughput in dense network scenario (500 m ISD, uniformly outdoor UE deployment).

SUMMARY

An object of the present disclosure is to provide solutions to alleviate inter-system interference from D2D communications to cellular communications in an asynchronous scenario.

According to a first aspect of the disclosure, there is provided a power control method performed by a UE in a mixed cellular and D2D network. The method includes: obtaining one or more power control related parameters for each of one or more neighboring cells of a serving cell for the UE from the serving cell or the neighboring cell. The one or more neighboring cells are asynchronous with the serving cell. The method further includes adapting a D2D transmission power of the UE based on the obtained power control related parameters so as to reduce interference from the UE to cellular transmission of the one or more neighboring cells.

According to a second aspect of the disclosure, there is provided a UE in a mixed cellular and D2D network for power control. The UE includes an obtaining unit configured to obtain one or more power control related parameters for each of one or more neighboring cells of a serving cell for the UE from the serving cell or the neighboring cell. The one or more neighboring cells are asynchronous with the serving cell. The UE further includes an adapting unit configured to adapt a D2D transmission power of the UE based on the obtained power control related parameters so as to reduce interference from the UE to cellular transmission of the one or more neighboring cells.

According to a third aspect of the disclosure, there is provided a UE in a mixed cellular and D2D network for power control. The UE includes: a processor; and a memory including instructions which, when executed by said processor, cause said UE to: obtain one or more power control related parameters for each of one or more neighboring cells of a serving cell for the UE from the serving cell or the neighboring cell, the one or more neighboring cells being asynchronous with the serving cell; and adapt a D2D transmission power of the UE based on the obtained power control related parameters so as to reduce interference from the UE to cellular transmission of the one or more neighboring cells.

According to a fourth aspect of the disclosure, there is provided a computer program product storing instructions that when executed, cause one or more computing devices to perform the method of the first aspect.

According to the first to fourth aspects of the disclosure, inter-system interference from D2D communications to cellular communications in an asynchronous scenario can be reduced.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF EMBODIMENTS

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Figure 1:
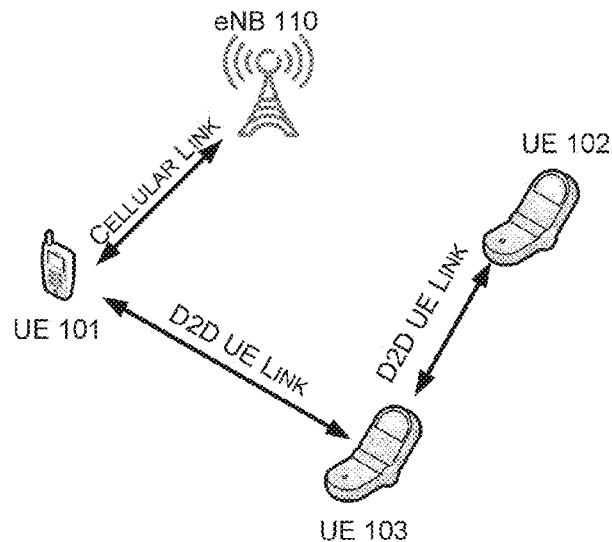
FIG. 1 is a diagram illustrating a mixed cellular and D2D network according to the prior art.
Figure 2:
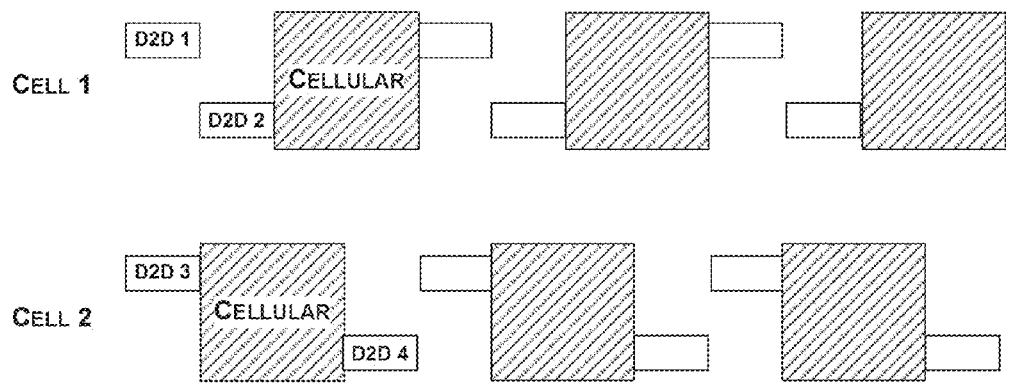
FIG. 2 is a diagram illustrating an example TDM based cellular/D2D resource division.
Figure 3:
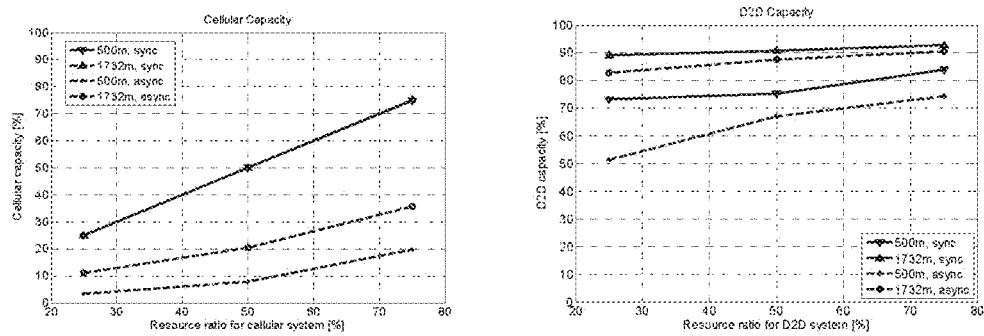
FIG. 3 illustrates simulations for cellular capacity versus D2D capacity via the TDM solution in different scenarios according to the prior art.
Figure 4:
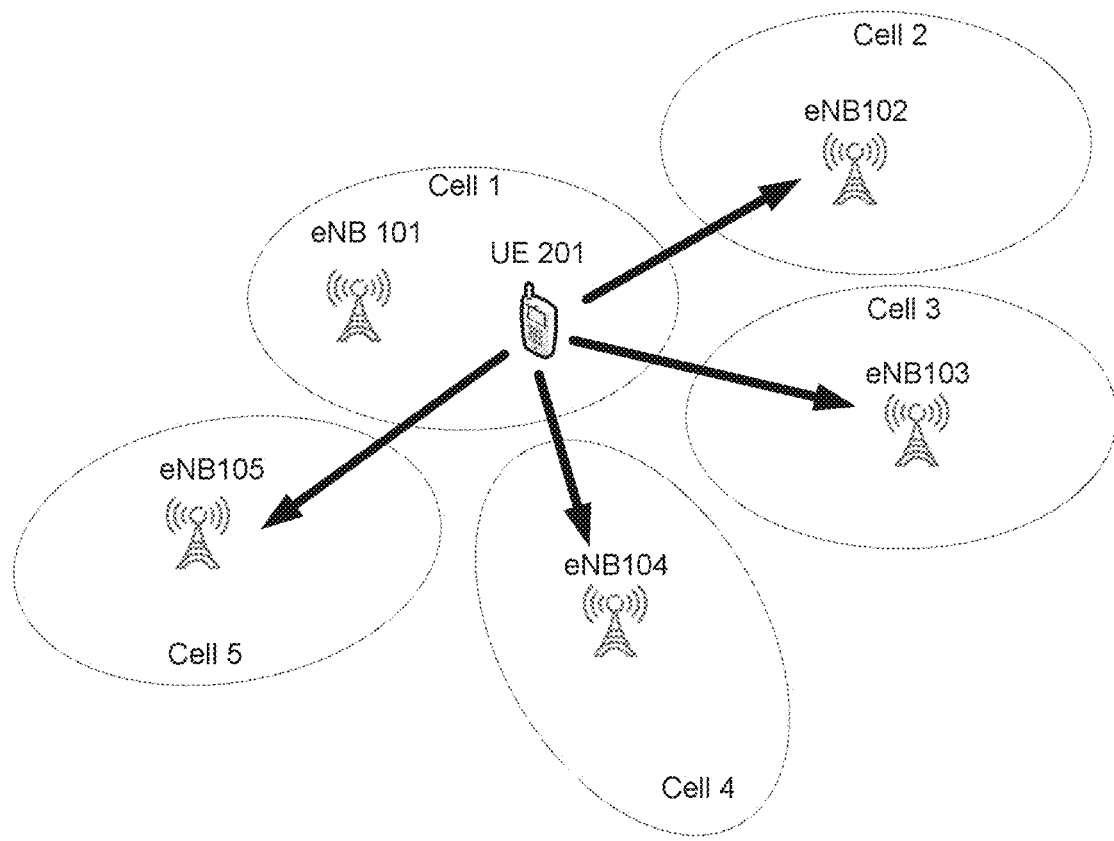
FIG. 4 is a diagram illustrating an example mixed cellular and D2D scenario of the mixed cellular and D2D network as shown in FIG. 1, where the present disclosure may be applied.

FIG. 4 schematically illustrates an example mixed cellular and D2D scenario of the mixed cellular and D2D network as shown in FIG. 1, where the present disclosure may be applied. As illustrated in FIG. 4, eNB 101 and UE 201 are distributed in Cell 1, and four cells, i.e., Cells 2-5, which are served by eNBs 102-105 respectively, are geographically close to Cell 1. Although FIG. 4 is exemplified in the context of one UE and five cells, any other number of UEs and any other number of cells may be also applied here.

As mentioned in the above, D2D communications of UE 201 may cause interference to cellular communications of neighboring cells, e.g., one or more of Cells 2-5 in FIG. 4.

The present disclosure is proposed to alleviate such interference by adapting D2D transmission power of UE 201.

Figure 5:
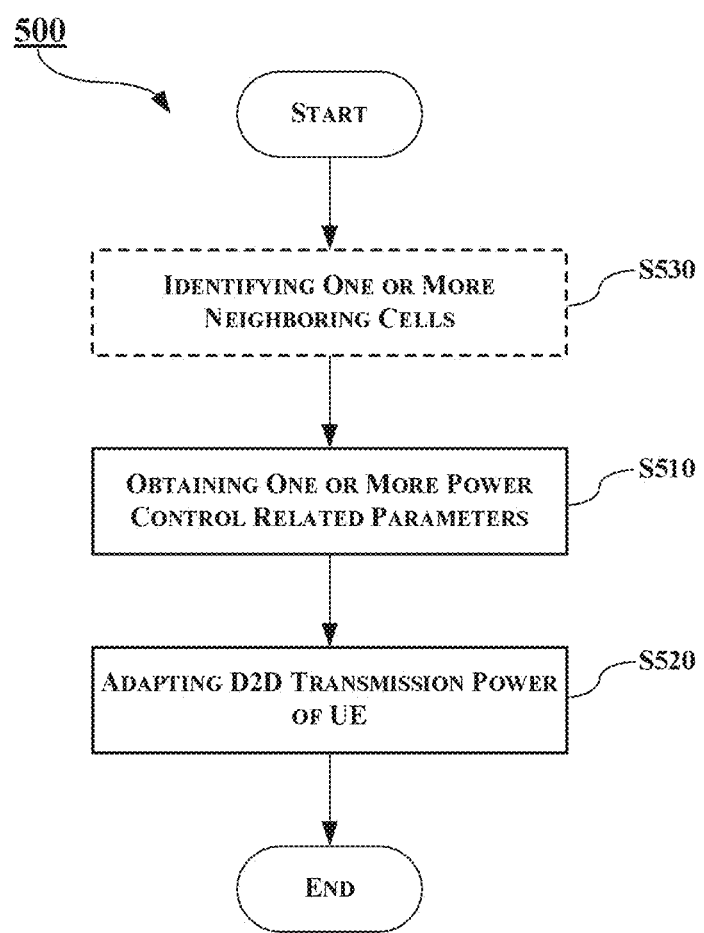
FIG. 5 is a flowchart illustrating a power control method 500 according to some embodiments of the present disclosure.

FIG. 5 is a flowchart schematically illustrating a power control method 500 performed by a UE, such as UE 201 in FIG. 4, in a mixed cellular and D2D network (e.g., the mixed cellular and D2D network as shown in FIG. 4) according to some embodiments of the present disclosure.

At step S510, the UE obtains one or more power control related parameters for each of one or more neighboring cells of a serving cell for the UE from the serving cell or the neighboring cell. The one or more neighboring cells are asynchronous with the serving cell.

In an implementation, the one or more power control related parameters for each of the one or more neighboring cells can be obtained from the serving cell via system broadcast information such as System Information Block (SIB) of the serving cell. Alternatively, the one or more power control related parameters for each of the one or more neighboring cells can be obtained from the serving cell via Radio Resource Control (RRC) signaling. This may be performed in advance.

In another implementation, the one or more power control related parameters for each of the one or more neighboring cells can be obtained from the neighboring cell via system broadcast information such as SIB of the neighboring cell.

At step S520, the UE adapts a D2D transmission power of the UE based on the obtained power control related parameters so as to reduce interference from the UE to cellular transmission of the one or more neighboring cells.

Before step S510, the method 500 may optionally include step S530, where the UE identifies the one or more neighboring cells which are asynchronous with the serving cell.

As a feasible manner to implement step S530, the UE receives a neighboring cell list from the serving cell; and for each neighboring cell in the neighboring cell list: comparing a starting time of a frame between the neighboring cell and the serving cell; and determining whether the neighboring cell is asynchronous with the serving cell based on the comparison.

Another feasible manner to implement step S530 is to receive from the serving cell an indication indicating the one or more neighboring cells.

One major advantage with the method 500 is that interference from D2D communications to cellular communications can be reduced by adapting D2D transmission power.

Figure 6:
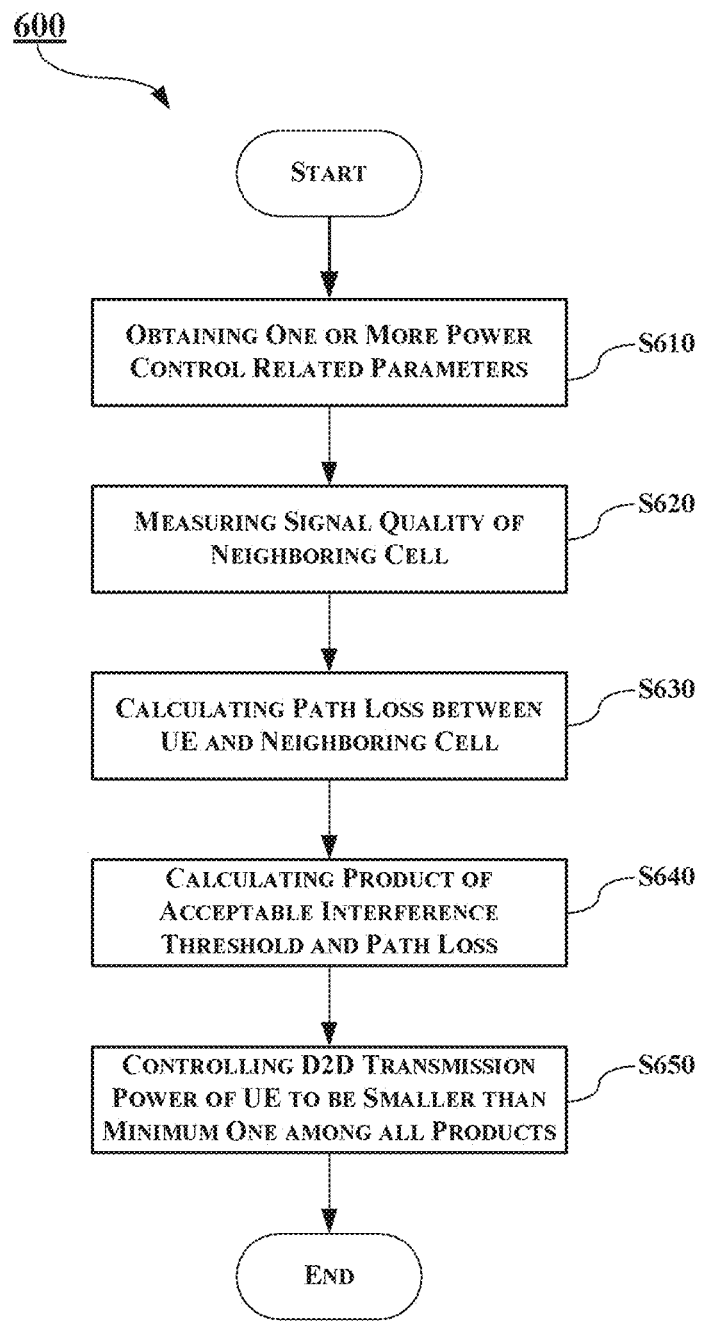
FIG. 6 is a flowchart illustrating another power control method 600 according to some embodiments of the present disclosure.

FIG. 6 is a flowchart schematically illustrating another power control method 600 performed by a UE, such as UE 201 in FIG. 4, in a mixed cellular and D2D network (e.g., the mixed cellular and D2D network as shown in FIG. 4) according to some embodiments of the present disclosure.

At step S610, the UE obtains one or more power control related parameters for each of one or more neighboring cells of a serving cell for the UE from the serving cell or the neighboring cell. The one or more neighboring cells are asynchronous with the serving cell. Step S610 is substantially equivalent to step S510, and thus detailed description thereof will be omitted. Similarly, before step S610, the method 600 may further include a step of identifying the one or more neighboring cells which are asynchronous with the serving cell (not shown). Such a step is substantially equivalent to step S530, and thus detailed description thereof will be omitted.

For each of the one or more neighboring cells, the one or more power control related parameters include an acceptable interference threshold of the neighboring cell, denoted as Power_mask, and Reference Signal (RS) related information of the neighboring cell. RS related information of each neighboring cell may include transmission power of the corresponding cell and RS format of the RS, which may be used to assist the UE in measuring a signal quality of the neighboring cell. Alternatively, the one or more power control related parameters may include information on cell ID of each of the one or more neighboring cells.

At step S620, for each of the one or more neighboring cells, the UE measures a signal quality of the neighboring cell based on the RS related information of the neighboring cell. The signal quality may be indicated by Reference Signal Receiving Power (RSRP), Reference Signal Receiving Quality (RSRQ) or Channel Quality Indicator (CQI) of the RS. It should be noted that the measurement of the signal quality may be implemented by means of the existing approaches, e.g., those specified in 3GPP standards.

At step S630, the UE calculates a path loss, denoted as PL, between the UE and the neighboring cell based on the measured signal quality. For example, PL may be calculated based on the measured signal quality and transmission power of the RS.

At step S640, the UE calculates a product of an acceptable interference threshold and the path loss for the neighboring cell.

It should be noted that steps S620-640 are performed for each of the one or more neighboring cells which are asynchronous with the serving cell.

At step 650, the UE controls D2D transmission power of the UE to be smaller than the minimum one among all the respective products for the one or more neighboring cells.

Assuming i is a cell ID index for one neighboring cell of the one or more neighboring cells which are asynchronous with the serving cell, where i is a positive integer not larger than the number of the one or more neighboring cells, then Power_mask[i] and PL[i] correspond to an acceptable interference threshold and a path loss of the neighboring cell, respectively. In this case, the D2D transmission power of the UE may be controlled to be smaller than the min{Power_mask[i]*PL[i]}.

Apparently, the method 600 can efficiently reduce interference from D2D communications to cellular communications of neighboring cell(s). This may be embodied in FIG. 7.

Figure 7:
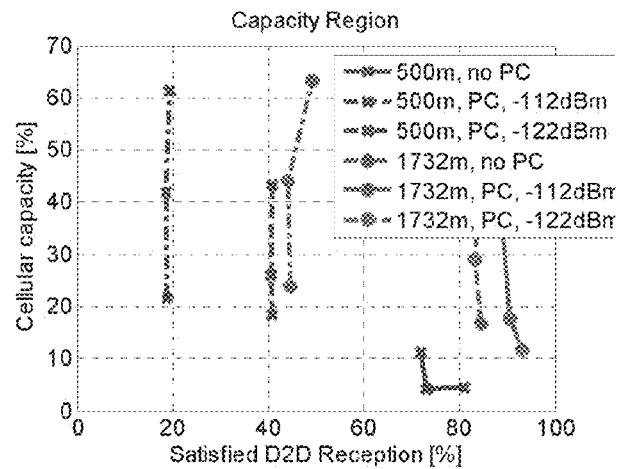
FIG. 7 is a diagram illustrating simulation results for comparing mixed cellular and D2D cases with/without power control according to the present disclosure in different scenarios.

FIG. 7 is a diagram illustrating simulation results for comparing mixed cellular and D2D cases with/without power control according to the present disclosure in different scenarios. In FIG. 7, a solid line represents a case without power control, a slash line represents a case with inter-cell power control (having an interference threshold as −112 dBm), and a dot-slash line represents a case with inter-cell power control (having an interference threshold as −122 dBm). From the simulation results, it can be seen that cellular performance can be improved for cases with power control in comparison with cases without power control.

Figure 8:
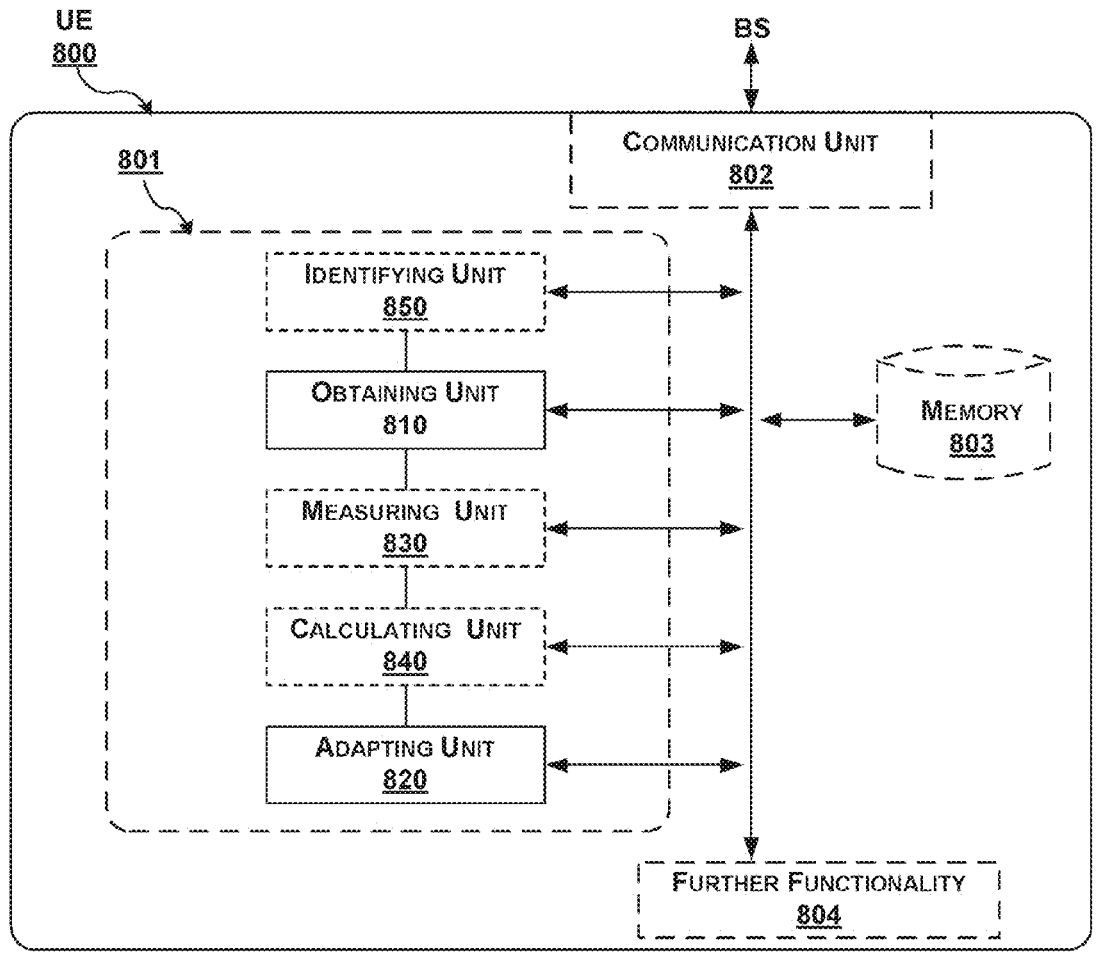
FIG. 8 is a schematic block diagram of a UE 800 according to some embodiments of the present disclosure.

FIG. 8 is a schematic block diagram of a UE 800 in a mixed cellular and D2D network for power control according to some embodiments of the present disclosure.

The part of the UE 800 which is most affected by the adaptation to the herein described method, e.g., the method 500 or 600, is illustrated as an arrangement 801, surrounded by a dashed line. The UE 800 could be e.g. a mobile terminal, depending on in which type of communication system it is operable, e.g., LTE-type systems. For example, the UE 800 may be configured for operation with, for example, an LTE network, formally known as the Evolved Universal Terrestrial Radio Access Network (E-UTRAN). The UE 800 and arrangement 801 are further configured to communicate with other entities via a communication unit 802 which may be regarded as part of the arrangement 801. The communication unit 802 comprises means for wireless communication, such as an antenna. The arrangement 801 or UE 800 may further include other functional units 804, such as functional units providing regular UE functions, and may further comprise one or more storage units or memory 803 for storing computer program code and other information thereon. The memory 803 may comprise one or several types of memory such as read-only memory (ROM), random-access memory, cache memory, flash memory devices, optical storage devices, etc.

The arrangement 801 could be implemented, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 5 or 6. The arrangement part of the UE 800 may be implemented and/or described as follows.

Referring to FIG. 8, the UE 800 may include an obtaining unit 810, an adapting unit 820, a measuring unit 830, a calculating unit 840, and an identifying unit 850. The measuring unit 830, the calculating unit 840, and the identifying unit 850 are optional.

The obtaining unit 810 may obtain one or more power control related parameters for each of one or more neighboring cells of a serving cell for the UE from the serving cell or the neighboring cell. The one or more neighboring cells are asynchronous with the serving cell.

In an implementation, the obtaining unit 810 may obtain the one or more power control related parameters for each of the one or more neighboring cells from the serving cell via system broadcast information such as SIB of the neighboring cell. Alternatively, the one or more power control related parameters for each of the one or more neighboring cells can be obtained from the serving cell via RRC signaling in advance.

In another implementation, the obtaining unit 810 may obtain the one or more power control related parameters for each of the one or more neighboring cells from the neighboring cell via system broadcast information such as SIB of the neighboring cell.

The adapting unit 820 may adapt a D2D transmission power of the UE based on the obtained power control related parameters so as to reduce interference from the UE to cellular transmission of the one or more neighboring cells.

For each of the one or more neighboring cells, the one or more power control related parameters include an acceptable interference threshold of the neighboring cell and RS related information of the neighboring cell.

The measuring unit 830 may, for each of the one or more neighboring cells, measure a signal quality of the neighboring cell based on RS related information of the neighboring cell. For example, the signal quality may be indicated by RSRP, RSRQ or CQI of the RS.

The calculating unit 840 may calculate a path loss between the UE and the neighboring cell based on the measured signal quality, and calculate a product of an acceptable interference threshold and the path loss for the neighboring cell.

The adapting unit 820 may further control the D2D transmission power of the UE to be smaller than the minimum one among all the respective products for the one or more neighboring cells.

The identifying unit 850 may identify the one or more neighboring cells which are asynchronous with the serving cell.

In an implementation, the identifying unit 850 may identify the one or more neighboring cells by: receiving a neighboring cell list from the serving cell; and for each neighboring cell in the neighboring cell list: comparing starting time of a frame between the neighboring cell and the serving cell; and determining whether the neighboring cell is asynchronous with the serving cell based on the comparison.

In another implementation, the identifying unit 850 may identify the one or more neighboring cells by receiving from the serving cell an indication indicating the one or more neighboring cells.

It should be noted that two or more different units in this disclosure may be logically or physically combined. For example, the adapting unit 820 and the calculating unit 840 may be combined as one single unit.

Figure 9:
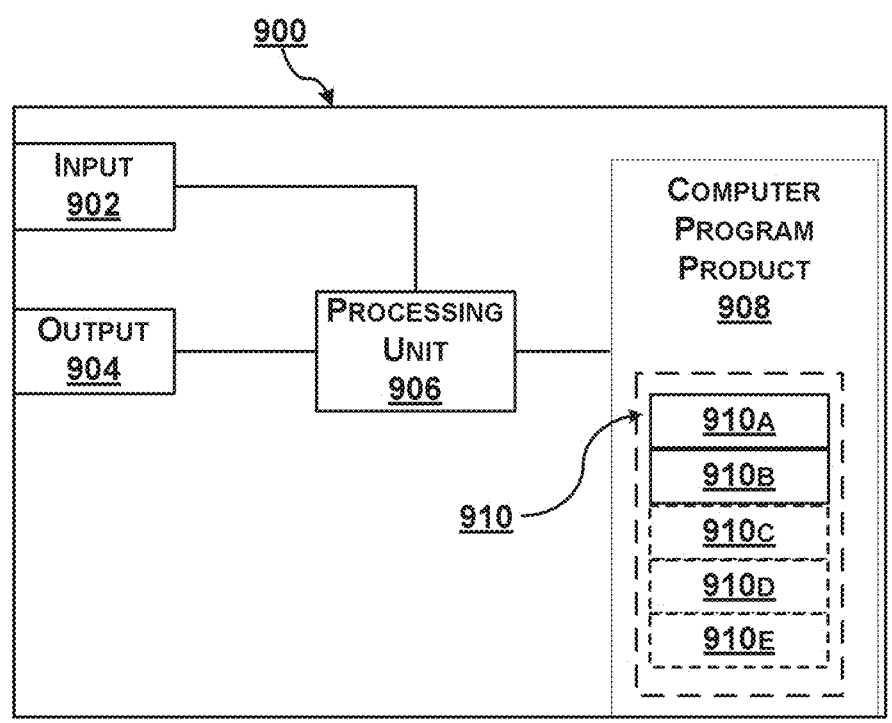
FIG. 9 schematically shows an embodiment of an arrangement 900 which may be used in the UE 800.

FIG. 9 schematically shows an embodiment of an arrangement 900 which may be used in the UE 800. Comprised in the arrangement 900 is here a processing unit 906, e.g., with a Digital Signal Processor (DSP). The processing unit 906 may be a single unit or a plurality of units to perform different actions of procedures described herein. The arrangement 900 may also comprise an input unit 902 for receiving signals from other entities, and an output unit 904 for providing signal(s) to other entities. The input unit and the output unit may be arranged as an integrated entity or as illustrated in the example of FIG. 8.

Furthermore, the arrangement 900 comprises at least one computer program product (or computer-readable storage medium) 908 in the form of a non-volatile or volatile memory, e.g., an Electrically Erasable Programmable Read-Only Memory (EEPROM), a flash memory and a hard drive. The computer program product 908 comprises a computer program 910, which comprises code/computer readable instructions, which when executed by the processing unit 906 in the arrangement 900 cause the arrangement 900 and/or the UE in which it is comprised to perform the actions, e.g., of the procedure described earlier in conjunction with FIG. 5 or 6.

The computer program 910 may be configured as a computer program code structured in computer program modules 910A and 9106 and optional 910C-910E.

Hence, in an exemplifying embodiment when the arrangement 900 is used in the UE 800, the code in the computer program of the arrangement 900 includes an obtaining module 910A, for obtaining one or more power control related parameters for each of one or more neighboring cells of a serving cell for the UE from the serving cell or the neighboring cell. The one or more neighboring cells are asynchronous with the serving cell. The code in the computer program 910 further includes an adapting module 910B, for adapting a D2D transmission power of the UE based on the obtained power control related parameters so as to reduce interference from the UE to cellular transmission of the one or more neighboring cells. The code in the computer program 910 further includes a measuring module 910C for, for each of the one or more neighboring cells, measuring a signal quality of the neighboring cell based on RS related information of the neighboring cell. The code in the computer program 910 further includes a calculating module 910D for, calculating a path loss between the UE and the neighboring cell based on the measured signal quality, and calculating a product of an acceptable interference threshold and the path loss for the neighboring cell. The code in the computer program 910 further includes an identifying module 910E for, identifying the one or more neighboring cells which are asynchronous with the serving cell.

The computer program modules could essentially perform the actions of the flow illustrated in FIG. 5 or 6, to emulate the arrangement 801 in the UE 800. In other words, when the different computer program modules are executed in the processing unit 906, they may correspond, e.g., to the units 810-850 of FIG. 8, respectively.

Although the code means in the embodiments disclosed above in conjunction with FIG. 9 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

Although the present technology has been described above with reference to specific embodiments, it is not intended to be limited to the specific form set forth herein. For example, the embodiments presented herein are not limited to LTE; rather they are equally applicable to other appropriate cellular systems such as High-Speed Packet Access (HSPA) or 5G Radio Access Technology (RAT) later. The technology is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

What is claimed is:

1. A power control method performed by a User Equipment (UE) in a mixed cellular and Device-to-Device (D2D) network, comprising:
   identifying one or more neighboring cells of a serving cell for the UE, the one or more neighboring cells being asynchronous in time domain with the serving cell;
   obtaining one or more power control related parameters for each of the one or more neighboring cells, the one or more power control related parameters being for the UE to measure a signal quality of the each of the one or more neighboring cells; and
adapting a D2D transmission power of the UE based on the obtained power control related parameters so as to reduce interference from the UE to cellular transmission of the one or more neighboring cells.

2. The method according to claim 1, wherein for each of the one or more neighboring cells, the one or more power control related parameters include an acceptable interference threshold of the neighboring cell and Reference Signal (RS) related information of the neighboring cell.

3. The method according to claim 2, further comprising:
for each of the one or more neighboring cells,
measuring a signal quality of the neighboring cell based on the RS related information of the neighboring cell;
calculating a path loss between the UE and the neighboring cell based on the measured signal quality; and
calculating a product of the acceptable interference threshold and the path loss for the neighboring cell,
wherein, adapting the D2D transmission power of the UE comprises controlling the D2D transmission power of the UE to be smaller than the minimum one among all the respective products for the one or more neighboring cells.

4. The method according to claim 3, wherein the signal quality is indicated by Reference Signal Receiving Power (RSRP), Reference Signal Receiving Quality (RSRQ) or Channel Quality Indicator (CQI) of the RS.

5. The method according to claim 1, wherein the one or more power control related parameters for each of the one or more neighboring cells are obtained from the serving cell via system broadcast information or Radio Resource Control (RRC) signaling, or from the neighboring cell via system broadcast information.

6. The method according to claim 1, wherein identifying the one or more neighboring cells comprises:
receiving a neighboring cell list from the serving cell; and
for each neighboring cell in the neighboring cell list:
comparing a starting time of a frame between the neighboring cell and the serving cell; and
determining whether the neighboring cell is asynchronous with the serving cell based on the comparison.

7. The method according to claim 1, wherein identifying the one or more neighboring cells comprises:
receiving from the serving cell an indication indicating the one or more neighboring cells.

8. A user equipment (UE) in a mixed cellular and Device-to-Device (D2D) network for power control, the UE comprising:
a processor and memory including instructions, which when executed by the processor, causing the UE to:
identify one or more neighboring cells of a serving cell, the one or more neighboring cells being asynchronous with the serving cell,
obtain one or more power control related parameters for each of the one or more neighboring cells for the UE, the one or more power control related parameters being for the UE to measure a signal quality of the each of the one or more neighboring cells, and
adapt a D2D transmission power of the UE based on the obtained power control related parameters so as to reduce interference from the UE to cellular transmission of the one or more neighboring cells.

9. The UE according to claim 8, wherein for each of the one or more neighboring cells, the one or more power control related parameters include an acceptable interference threshold of the neighboring cell and Reference Signal (RS) related information of the neighboring cell.

10. The UE according to claim 9, wherein the UE is further to:
for each of the one or more neighboring cells, measure a signal quality of the neighboring cell based on the RS related information of the neighboring cell, calculate a path loss between the UE and the neighboring cell based on the measured signal quality, and
calculate a product of the acceptable interference threshold and the path loss for the neighboring cell, and
wherein, adapting the D2D transmission power of the UE is to control the D2D transmission power of the UE to be smaller than the minimum one among all the respective products for the one or more neighboring cells.

11. The UE according to claim 10, wherein the signal quality is indicated by Reference Signal Receiving Power (RSRP), Reference Signal Receiving Quality (RSRQ) or Channel Quality Indicator (CQI) of the RS.

12. The UE according to claim 8, wherein the UE is further to obtain the one or more power control related parameters for each of the one or more neighboring cells from the serving cell via system broadcast information or Radio Resource Control (RRC) signaling, or from the neighboring cell via system broadcast information.

13. The UE according to claim 8, wherein the UE is further to:
receive a neighboring cell list from the serving cell, and
for each neighboring cell in the neighboring cell list:
compare starting time of a frame between the neighboring cell and the serving cell; and
determine whether the neighboring cell is asynchronous with the serving cell based on the comparison.

14. The UE according to claim 8, wherein the UE is further to:
receive from the serving cell an indication indicating the one or more neighboring cells.

15. A non-transitory computer-readable storage medium having instructions stored therein for performing power control in a mixed cellular and Device-to-Device (D2D) network, wherein the instructions, when executed by a processor of a User Equipment (UE), cause the processor to perform operations comprising:
identifying one or more neighboring cells of a serving cell, the one or more neighboring cells being asynchronous with the serving cell;
obtaining one or more power control related parameters for each of the one or more neighboring cells for the UE, the one or more power control related parameters being for the UE to measure a signal quality of the each of the one or more neighboring cells; and
adapting a D2D transmission power of the UE based on the obtained power control related parameters so as to reduce interference from the UE to cellular transmission of the one or more neighboring cells.

16. The non-transitory computer-readable storage medium according to claim 15, wherein for each of the one or more neighboring cells, the one or more power control related parameters include an acceptable interference threshold of the neighboring cell and Reference Signal (RS) related information of the neighboring cell.

17. The non-transitory computer-readable storage medium according to claim 16, having further instructions, that when executed by the processor, cause the processor to perform further operations comprising:
for each of the one or more neighboring cells, measuring a signal quality of the neighboring cell based on the RS related information of the neighboring cell;

calculating a path loss between the UE and the neighboring cell based on the measured signal quality; and calculating a product of the acceptable interference threshold and the path loss for the neighboring cell, wherein, adapting the D2D transmission power of the UE comprises controlling the D2D transmission power of the UE to be smaller than the minimum one among all the respective products for the one or more neighboring cells.

18. The non-transitory computer-readable storage medium according to claim 17, wherein the signal quality is indicated by Reference Signal Receiving Power (RSRP), Reference Signal Receiving Quality (RSRQ) or Channel Quality Indicator (CQI) of the RS.

19. The non-transitory computer-readable storage medium according to claim 15, wherein the one or more power control related parameters for each of the one or more neighboring cells are obtained from the serving cell via system broadcast information or Radio Resource Control (RRC) signaling, or from the neighboring cell via system broadcast information.

20. The non-transitory computer-readable storage medium according to claim 15, wherein identifying the one or more neighboring cells comprises:

receiving a neighboring cell list from the serving cell; and for each neighboring cell in the neighboring cell list:
comparing a starting time of a frame between the neighboring cell and the serving cell; and
determining whether the neighboring cell is asynchronous with the serving cell based on the comparison.

21. The non-transitory computer-readable storage medium according to claim 15, wherein identifying the one or more neighboring cells comprises:

receiving from the serving cell an indication indicating the one or more neighboring cells.

\* \* \* \* \*